United States Patent [19]

Loewe et al.

[11] Patent Number: 4,619,031

[45] Date of Patent: Oct. 28, 1986

[54] LINKAGE TOLERANCE COMPENSATING SYSTEM

[75] Inventors: Gerhard Loewe, Battle Creek; Egon Nithammer, Plainwell; Vikram Zaveri, Springfield, all of Mich.

[73] Assignee: Keiper Recaro, Inc., Battle Creek, Mich.

[21] Appl. No.: 639,579

[22] Filed: Aug. 10, 1984

[51] Int. Cl.[4] .................... B23P 11/00; B23P 19/00
[52] U.S. Cl. ............................ 29/434; 16/292;
 29/445; 29/559; 29/700; 29/824; 297/363
[58] Field of Search .................. 16/292; 29/434, 445,
 29/559, 700, 824; 297/363, 366

[56] References Cited

U.S. PATENT DOCUMENTS

| | | |
|---|---|---|
| 3,244,489 | 4/1966 | Parker ................................ 29/445 |
| 3,470,599 | 10/1969 | Burman et al. ................. 29/434 X |
| 4,223,946 | 9/1980 | Klueting ............................ 297/363 |
| 4,270,253 | 6/1981 | Herb et al. ...................... 29/445 X |
| 4,314,729 | 2/1982 | Klueting ............................ 297/366 |
| 4,355,846 | 10/1982 | Klueting et al. ................ 16/292 X |
| 4,375,716 | 3/1983 | Armstrong et al. ............ 29/434 X |
| 4,456,300 | 6/1984 | Klueting et al. ................ 16/292 X |

Primary Examiner—Howard N. Goldberg
Assistant Examiner—R. S. Wallace
Attorney, Agent, or Firm—Lloyd M. Forster

[57] ABSTRACT

The invention provides an actuating linkage assembly tolerance compensating system comprising means for establishing a final linkage pivot location at the end of assembly operations. The incomplete assembly is located with one end of a link in a piercing die press fixture oriented relative to connecting linkage to provide required final operating handle position.

8 Claims, 7 Drawing Figures

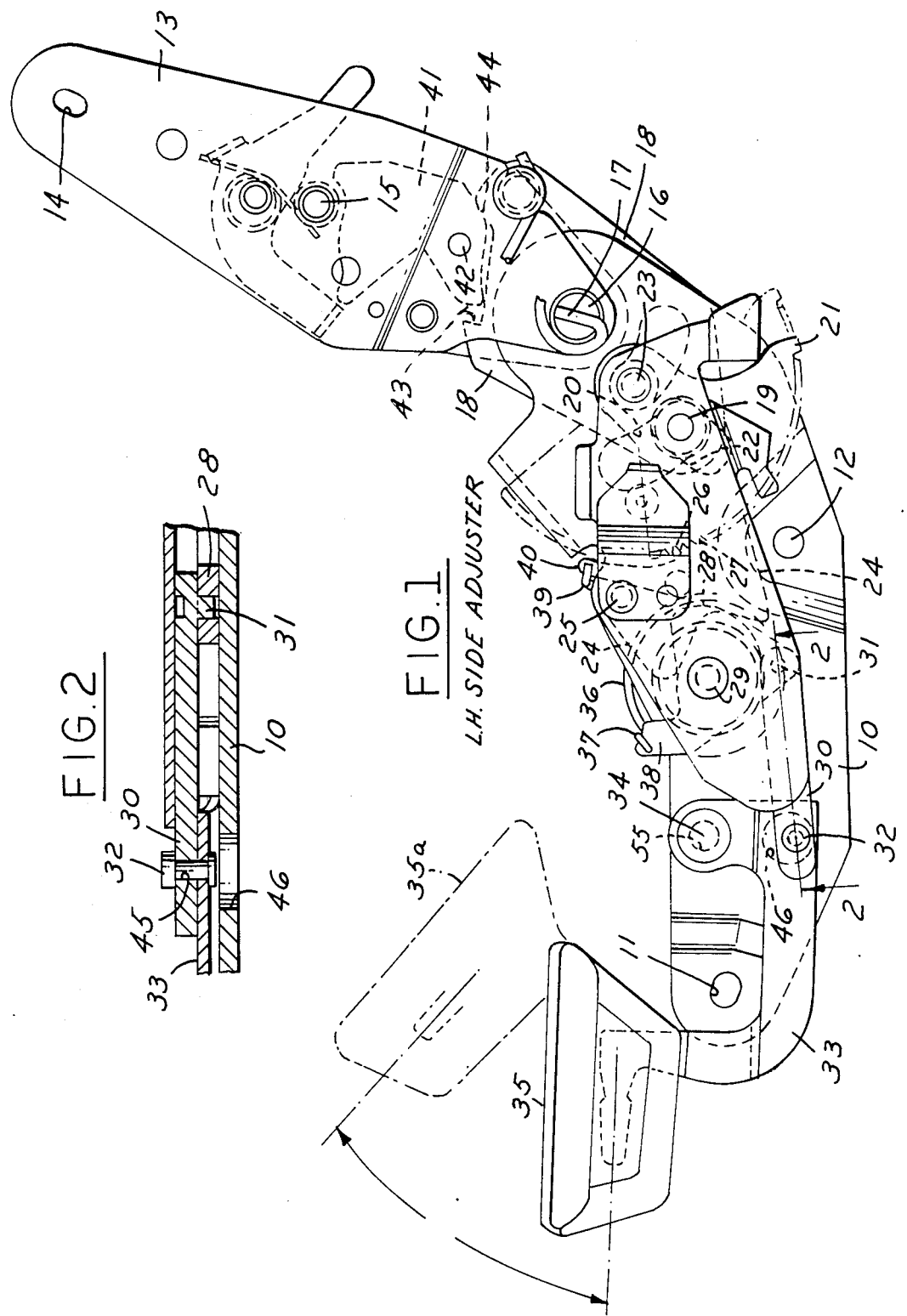

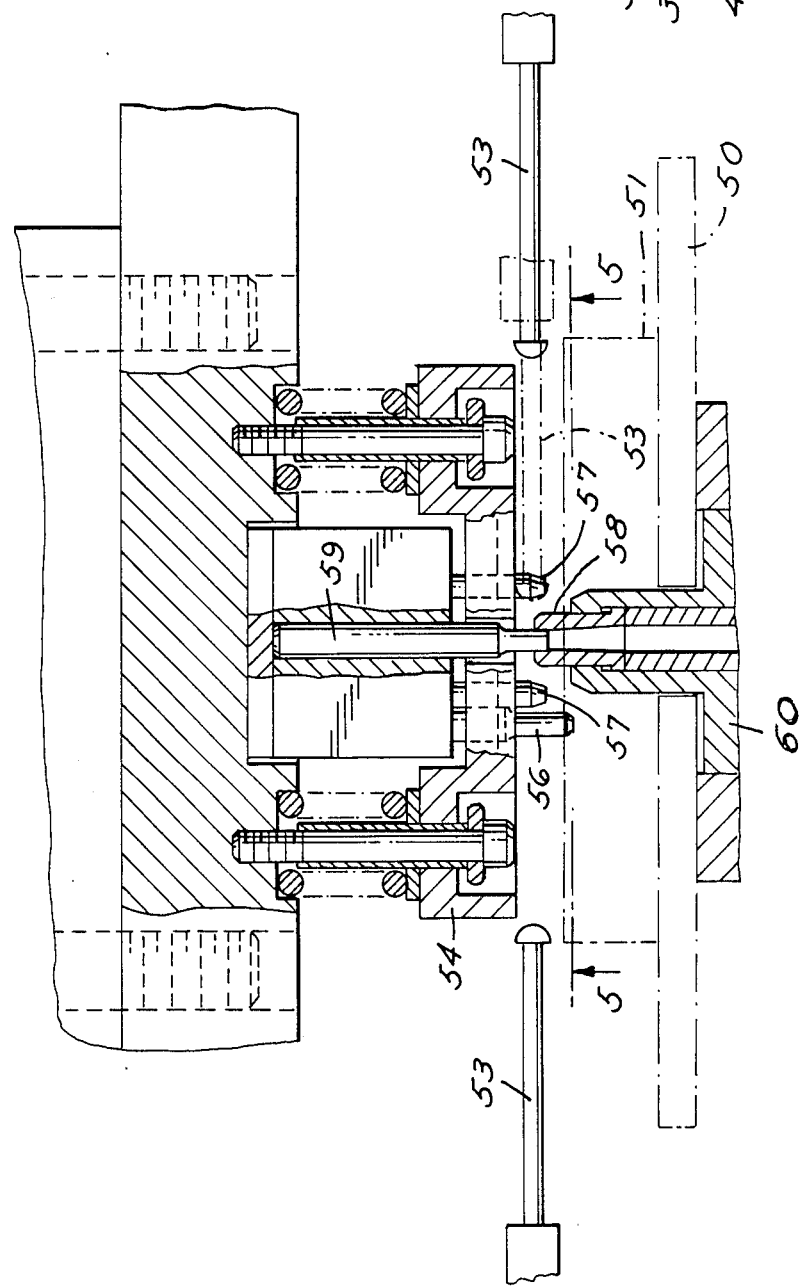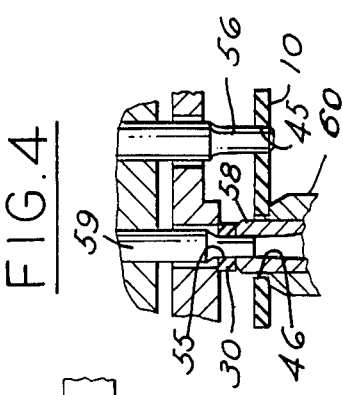

POSITION OF A R.H. LINK

L.H. ADJUSTER & LINK POSITION LOOKING UP INTO PUNCH PLATE FROM SECTION SHOWN IN FIG. 3

LINKAGE TOLERANCE COMPENSATING SYSTEM

BACKGROUND OF THE INVENTION

In mechanical pivoted linkage devices, for example seat back adjusters for automotive vehicles such as disclosed in U.S. Pat. Nos. 4,223,946 and 4,355,846, a stack up of tolerances contributing to the final position of a release handle may provide a substantial variation in the handle position when all linkage components are prefabricated in completed form for assembly. In some cases the problem is amplified, as in said patents, where a cam surface having a potential operating range over a substantial angular sector in reaching a seated position must be released through pivoted linkage where confining space parameters for handle actuation impose limits of travel which cannot be economically met through reduction in normal manufacturing tolerances. In such cases adjustable linkage or selective assembly of links having a range of different pivotal dimensions may be resorted to.

SUMMARY OF THE PRESENT INVENTION

Applicants have devised a practical seat back adjuster, and manufacturing linkage, tolerance compensating system which establishes during assembly the desired position of a pivoted linkage, for example in a normal retracted condition, while the preassembly is located with one end of an actuating link in a piercing die press fixture oriented relative to connecting linkage to provide the desired retractor handle relationship when the pivot hole is pierced and pivotally connected to a prepierced corresponding hole in the pivoted handle.

BRIEF DESCRIPTION OF THE DRAWINGS

FIG. 1 is a side elevation of a seat back adjuster incorporating linkage processed by the present system;

FIG. 2 is a fragmentary sectional view taken along the line 2—2 of FIG. 1;

FIG. 3 is a fragmentary sectional view of a piercing die press fixture;

FIG. 4 is a supplemental fragmentary view of the piercing die per se illustrated in FIG. 3 with the workpiece and an alternate locating pin in position;

DESCRIPTION OF THE PREFERRED EMBODIMENT

Figure 5:
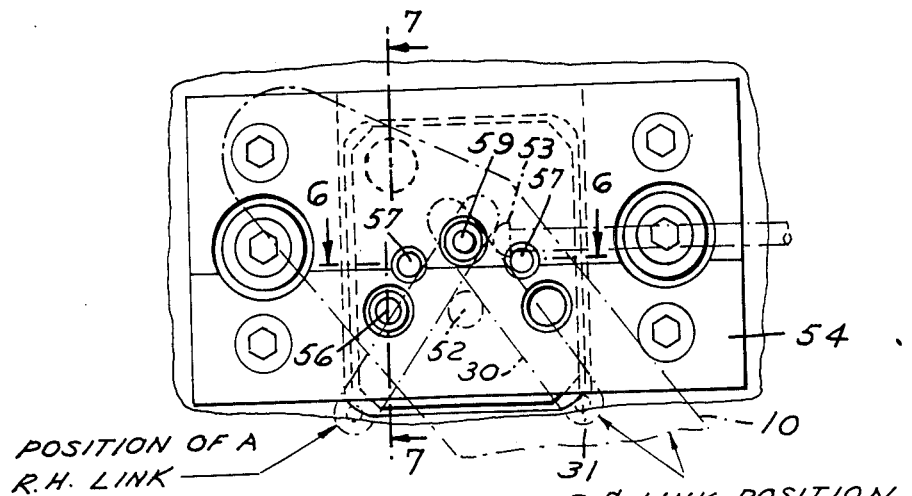
FIG. 5 is an upward view taken along the line 5—5 of FIG. 3.

With reference to FIG. 1, a seat back adjuster of the general type disclosed in U.S. Pat. Nos. 4,223,946 and 4,355,846 is illustrated with certain modifications relevant to the present invention. In general, the adjuster includes main lower bracket 10 adapted for attachment to a vehicle seat through bolt holes 11 and 12; an upper bracket 13 adapted for attachment to the back rest of the seat through bolt holes 14 and 15. Pivot bolt 16 connecting the upper and lower brackets is rigidly secured to lower bracket 10, preferably by interengaging press fit, and anchors a torque spring 17 for intermediate plate 18 which is also pivoted on bolt 16 and in turn connected by intermediate plate stud 19 to quadrant sector 21, passing through arcuate slotted opening 20 having a radius centered on the main pivot and engaging ratchet sector 21 through a short slotted opening 22.

Rivet 23 for sector 21 provides a pivotal mounting on lower seat bracket 10 and pawl 24 pivotally mounted to lower bracket 10 by pawl hinge bolt 25 has teeth 26 interengaging teeth 27 on sector 21. Pawl 24 is held in position by eccentric cam 28 pivotally mounted by cam rivet 29 to lower bracket 10 and is actuated in a clockwise release direction by link 30 connected to cam 28 at pivot 31 and at pivot 32 to release handle 33 in turn pivotally mounted at 34 to bracket 10.

Hand lever 33 is required to travel through a maximum angle of 40° from full line position shown at 35 to phantom position shown at 35a causing cam 28 to retract from locking engagement with pawl 24 permitting disengagement of pawl teeth 26 from sector teeth 27. Such disengagement is induced by the bias of coiled spring 36 wound under contracting bias to produce a counterclockwise torque through engagement of spring end 37 with cam extension 38 and a clockwise torque on pawl 24 through engagement of spring end 39 on extension 40 of pawl 24.

Inertia latch 41 pivoted at 42 opens by gravity to permit forward seat back tilting for rear passenger ingress and egress in a two-door model car under stationary conditions, such tilting being prevented by latch nose engagement at 43 under sudden deceleration. Back stop for upper bracket 13 relative to intermediate plate 18 is provided by direct latch tail surface engagement at 44 serving to orient latch 41 to its nose engagement attitude as shown as well as to prevent latch rattling.

From the description thus far it will be understood that the effective seat back position may be adjusted upon release of cam 28 and pawl 24 through pivotal movement of intermediate plate 18 actuating stud 19 to actuate sector 21 about its pivot 23 with a translation amplification of angular movement based on the relatively shorter spacing of pivots 19 and 23 compared to the spacing between pivots 19 and 16; such amplification resulting in a finer adjustment of seat back angle for a given tooth pitch than would otherwise result.

It will also be understood that if all component parts were prefabricated with pivotal spacing established, the effective position 35 of hand lever 33 with all clearance taken up between cam 28, pawl 24 and sector 21 will be affected by numerous tolerance factors such as location and clearance of pivot 23, effective pitch radius of teeth 27, location and clearance of pivot 25, dimensional configuration of pawl 24 and cam 28, size and location of pivot 29, size and relative location of pivots 31 and 32.

It will also be understood that if the final location of one of the pivots, such as pivot 32 could be determined on assembly with other components pre-assembled, pawl 24 fully engaged, cam 28 fully seated, all clearances taken up, and the required position of link 30 relative to hand lever 33 and seat bracket 10 established by a predetermined fixture positioning, the problem of unacceptable variation in the hand lever at rest position could be solved.

Figure 6:
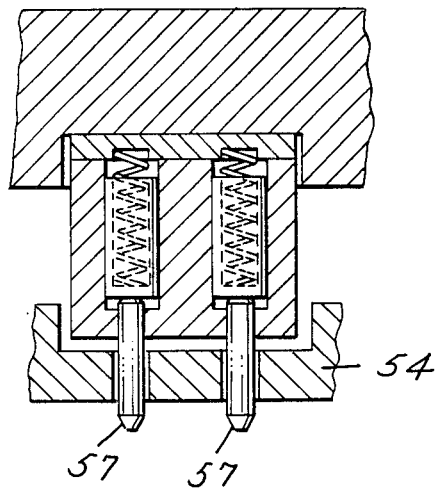
FIG. 6 is a fragmentary sectional view taken along the line 6—6 of FIG. 5.
Figure 7:
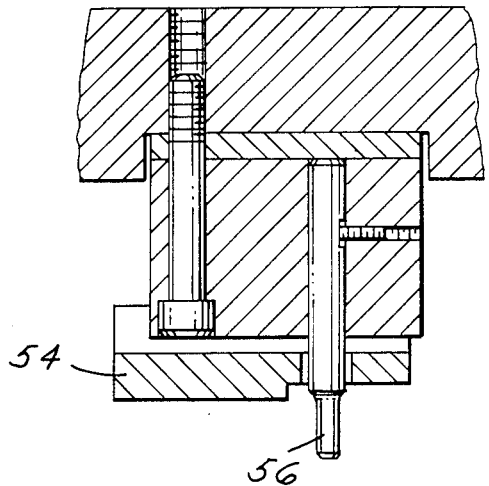
FIG. 7 is a fragmentary sectional view taken along the line 7—7 of FIG. 5.

With reference to FIGS. 3-7 means for piercing hole 55 for pivot 32 in link 30 on assembly will now be described. In general the system involves a mechanical punch station on an assemblyline wherein pallets are conveyed to the station, stopped and accurately located with shot pins relative to the station tooling.

Pallet 50 fixture 51 is adapted to locate the adjuster assembly, complete except for omission of hand lever 33, through fixture locators, not shown, engaging bracket 10 mounting holes 11 and 12. At the stations, trap link 30 is pre-positioned against a carrier stop pin 52 by one of station piston rods 53 depending on whether a right or left hand assembly is on the carrier. Upon lowering punch head 54, following retraction of piston rod 53, precise location for hole 55 in trap link 30 is assured by orienting hole 45 in bracket 10 for pivot 34 effected by pin 56 engagement, accommodated by free fit clearance in the fixture engagement of mounting holes 11 and 12, alternate pin 56 positions for left and right hand adjusters being shown respectively in FIGS. 3 and 4. One of the pins 57 in punch head 54, in cooperation with carrier stop pin 52, trap link 30 and female die 58 passes through clearance hole 46 in bracket 10 to engage trap link 30 as a reaction surface for the punching operation effected by punch 59, die holder 60 passing through a pallet aperture along with the pallet shot pin locators. The other of pins 57 recedes upon workpiece engagement as permitted by spring mounting shown in FIG. 6.

In this manner the hole in trap link 30 for pivot pin 32 is accurately punched for proper location of hand lever 33 for each individual seat back adjuster regardless of tolerance variations in the pivot and cam components affecting the operative position of trap link 30 pivot 31. Symmetrical station tooling, as illustrated, will accommodate right and left hand seat adjuster assemblies at the same station. Pallets are likewise provided with locators for right and left hand assemblies in order to minimize production equipment expense.

We claim:

1. A method for fabricating an actuating linkage assembly having a connecting link with two spaced pivot provisions with a tolerance compensating manufacturing system comprising the steps of prefabricating linkage components other than one pivot provision in said link the variable location of which can compensate for composite tolerance variations in the assembled components, preassembling said components on a fixture having locating means for positioning said assembly at a manufacturing station for establishing said one pivot location, locating said assembled components including said link at said station in required final assembled relation, establishing said one pivot provision in said link while said assembled components are located and held in said required relation, and completing said final assembly with said assembly located one pivot provision.

2. In the method set forth in claim 1 placing said fixture on a pallet means for transport positioning and holding a seat back adjuster assembly at said station.

3. In the method set forth in claim 2 providing free fit loading of the seat mounting bracket of said assembly on said fixture for final positioning through station tooling.

4. In the method set forth in claim 3 providing station tooling means for precisely locating components of said assembly relative to said required one pivot location.

5. In the method set forth in claim 4 providing station means for establishing effective location of said one pivot provision.

6. In the method set forth in claim 5 providing said station means with a hole punch.

7. In the method set forth in claim 6 providing said station means with a female die including support means for engaging said link during hole punching operation.

8. In the method set forth in claim 3 providing clearance in said pallet and mounting bracket accommodating die passage to supportingly engage said link for said punching operation.

* * * * *